US011176075B2

(12) United States Patent
Ngo et al.

(10) Patent No.: US 11,176,075 B2
(45) Date of Patent: Nov. 16, 2021

(54) HYBRID BUS HUB CIRCUIT AND RELATED APPARATUS

(71) Applicant: Qorvo US, Inc., Greensboro, NC (US)

(72) Inventors: Christopher Truong Ngo, Queen Creek, AZ (US); Alexander Wayne Hietala, Phoenix, AZ (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 16/430,617

(22) Filed: Jun. 4, 2019

(65) Prior Publication Data

US 2020/0151131 A1 May 14, 2020

Related U.S. Application Data

(60) Provisional application No. 62/757,448, filed on Nov. 8, 2018, provisional application No. 62/842,488, filed on May 2, 2019.

(51) Int. Cl.
*G06F 13/40* (2006.01)
*H04L 12/40* (2006.01)
*H04B 1/16* (2006.01)

(52) U.S. Cl.
CPC ........... *G06F 13/4027* (2013.01); *H04B 1/16* (2013.01); *H04L 12/40* (2013.01)

(58) Field of Classification Search
CPC ........ G06F 13/4027; H04B 1/16; H04L 12/40
See application file for complete search history.

(56) References Cited

U.S. PATENT DOCUMENTS

| 10,185,683 | B2 | 1/2019 | Ngo et al. | |
|---|---|---|---|---|
| 2008/0046603 | A1 | 2/2008 | Kobayashi et al. | |
| 2012/0179922 | A1* | 7/2012 | Mehrotra | G06F 1/3278 713/300 |
| 2014/0304442 | A1* | 10/2014 | Hietala | G06F 13/4291 710/110 |
| 2015/0019782 | A1 | 1/2015 | Decesaris et al. | |

(Continued)

OTHER PUBLICATIONS

Non-Final Office Action for U.S. Appl. No. 16/391,646, dated Sep. 27, 2019, 14 pages.

(Continued)

*Primary Examiner* — Idriss N Alrobaye
*Assistant Examiner* — Ronald T Modo
(74) *Attorney, Agent, or Firm* — Withrow & Terranova, PLLC

(57) ABSTRACT

A hybrid bus hub circuit and related apparatus are provided. The bus hub circuit can be configured to bridge a radio frequency front-end (RFFE) bus with a number of auxiliary buses of different types. Each of the auxiliary buses may support a fixed number of slaves identified respectively by a unique slave identification (USID). The hybrid bus hub circuit can be configured to selectively activate an auxiliary bus(es) for communication with the RFFE bus, thus making it possible to reuse a same set of USIDs among the auxiliary buses without causing potential identification conflict. As such, it may be possible to support more slaves in an apparatus with a single RFFE bus. As a result, it may be possible to reduce pin count requirement for an RFFE master and/or enable flexible heterogeneous bus deployment in the apparatus.

20 Claims, 9 Drawing Sheets

(56) References Cited

U.S. PATENT DOCUMENTS

| | | | |
|---|---|---|---|
| 2015/0149673 A1* | 5/2015 | Balkan | G06F 13/362 |
| | | | 710/110 |
| 2015/0169482 A1 | 6/2015 | Ngo et al. | |
| 2015/0192974 A1 | 7/2015 | Ngo et al. | |
| 2015/0193297 A1 | 7/2015 | Ngo et al. | |
| 2015/0193298 A1 | 7/2015 | Ngo et al. | |
| 2015/0193321 A1 | 7/2015 | Ngo et al. | |
| 2015/0193373 A1 | 7/2015 | Ngo et al. | |
| 2017/0255250 A1 | 9/2017 | Ngo et al. | |
| 2017/0255578 A1 | 9/2017 | Ngo et al. | |
| 2017/0255579 A1* | 9/2017 | Ngo | G06F 13/404 |
| 2017/0277651 A1* | 9/2017 | Ngo | G06F 13/364 |
| 2018/0234383 A1 | 8/2018 | Daugherty et al. | |
| 2019/0236042 A1 | 8/2019 | O'Shea et al. | |
| 2020/0050575 A1 | 2/2020 | Mishra et al. | |
| 2020/0081859 A1 | 3/2020 | Mishra et al. | |
| 2020/0083875 A1 | 3/2020 | Mishra et al. | |

OTHER PUBLICATIONS

Notice of Allowance for U.S. Appl. No. 16/391,646, dated Mar. 5, 2020, 8 pages.

Infineon, "BGSA141MN10: Low Resistance Antenna Aperture Switch," Final Data Sheet, Revision 2.0, Jun. 12, 2017, Infineon Technologies AG, 23 pages.

MIPI Alliance, "MIPI Alliance Specification for RF Front-End Control Interface," Version 1.10, Jul. 26, 2011, MIPI Alliance, Inc., 90 pages.

Ross, J. et al., "Inside MIPI RFFE v2.1: Enabling the 5G transformation," Apr. 30, 2018, EDN Network, 4 pages.

Ross, J. et al., "MIPI RFFE v2.0 Webinar: An Overview of New Features and Implemenlation Benefits," Feb. 17, 2015, MIPI Alliance, Inc., 32 pages.

Wilkerson, V. et al., "Unification in the RF front-end: the new MIPI standard," Aug. 11, 2010, EE Times, 7 pages.

Non-Final Office Action for U.S. Appl. No. 16/414,007, dated Apr. 14, 2021, 24 pages.

* cited by examiner

HYBRID BUS HUB CIRCUIT AND RELATED APPARATUS

RELATED APPLICATIONS

This application claims the benefit of U.S. provisional patent application Ser. No. 62/757,448, filed on Nov. 8, 2018, and U.S. provisional patent application Ser. No. 62/842,488, filed on May 2, 2019, the disclosures of which are incorporated herein by reference in their entireties.

This application is related to U.S. patent application Ser. No. 16/391,646, filed on Apr. 23, 2019 and issued as U.S. Pat. No. 10,707,911, entitled "RADIO FREQUENCY FRONT-END BUS HUB CIRCUIT AND RELATED APPARATUS," and U.S. patent application Ser. No. 16/414,007, filed on May 16, 2019 and published as U.S. Patent Application Publication No. 2020/0151125, entitled "HETEROGENEOUS BUS BRIDGE CIRCUIT AND RELATED APPARATUS," the disclosures of which are incorporated herein by reference in their entireties.

FIELD OF THE DISCLOSURE

The technology of the disclosure relates generally to a hybrid bus hub circuit configured to support heterogeneous communication buses.

BACKGROUND

Mobile communication devices have become increasingly common in current society. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

The redefined user experience requires higher data rates offered by wireless communication technologies, such as Wi-Fi, long-term evolution (LTE), and fifth-generation new-radio (5G-NR). To achieve the higher data rates in mobile communication devices, a radio frequency (RF) signal(s) may first be modulated by a transceiver circuit(s) based on a selected modulation and coding scheme (MCS) and then amplified by a power amplifier(s) prior to being radiated from an antenna(s). In many wireless communication devices, the power amplifier(s) and the antenna(s) are typically located in an RF front-end (RFFE) circuit communicatively coupled to the transceiver circuit(s) via an RFFE bus as defined in the MIPI® alliance specification for radio frequency front-end control interface, version 2.1 (hereinafter referred to as "RFFE specification").

In this regard, FIG. 1 is a schematic diagram of an exemplary RFFE bus apparatus 10 as defined in the RFFE specification. The RFFE bus apparatus 10 includes an RFFE master 12 coupled to a number of RFFE slaves 14(1)-14(M) over an RFFE bus 16. According to the RFFE specification, the RFFE bus 16 is a two-wire serial bus that includes a data line 18 and a clock line 20 for communicating a bidirectional data signal SDATA and a clock signal SCLK, respectively. Since the RFFE bus 16 is a two-wire serial bus, the RFFE bus 16 is capable of operating at a faster data rate (also referred to as "first data rate" hereinafter).

Further according to the RFFE specification, each of the RFFE slaves 14(1)-14(M) is required to have a unique slave identification (USID) and the RFFE bus apparatus 10 can support fifteen (15) USIDs between hexadecimal value 0x1 and hexadecimal value 0xF (0x1-0xF). The RFFE specification further assigns hexadecimal value 0x0 to represent a broadcast slave identification (BSID) for all the RFFE slaves 14(1)-14(M). According to the RFFE specifications, each of the RFFE slaves 14(1)-14(M) is assigned one of 15 USIDs by a system integrator. Accordingly, in the RFFE bus apparatus 10, it is possible to connect up to 15 RFFE slaves 14(1)-14(15) to the RFFE master 12 via the RFFE bus 16.

The RFFE specification also allows any of the 15 USIDs being used as a group slave identification (GSID) to identify an RFFE slave group. For example, the RFFE bus apparatus 10 includes five RFFE slaves associated with USIDs 0x1-0x5, respectively. The RFFE slaves associated with USIDs 0x1-0x3 may be clustered into a first RFFE slave group and the RFFE slaves associated with USIDs 0x4-0x5 may be clustered into a second RFFE slave group. The first RFFE slave group and the second RFFE slave group may be assigned USIDs 0x6 and 0x7, respectively. In this regard, the USIDs 0x6 and 0x7 are now used as GSIDs to identify the first RFFE slave group and the second RFFE slave group, respectively. Notably, there will be a lesser number of USIDs available to identify the RFFE slaves 14(1)-14(M) if any of the 15 USIDs is used to represent a GSID.

The RFFE master 12 is configured to communicate with the RFFE slaves 14(1)-14(M) based on RFFE command sequences (e.g. register-write command sequence, register-read command sequence, trigger command sequence, etc.). According to the RFFE specification, only the RFFE master 12 can initiate an RFFE command sequence on the RFFE bus 16.

Each of the RFFE command sequences can be associated with a USID, a GSID, or a BSID. When an RFFE command sequence is communicated based on a specific USID, the RFFE command sequence is addressed to a specific RFFE slave among the RFFE slaves 14(1)-14(M) that is identified by the specific USID. When an RFFE command sequence is communicated based on a specific GSID, the RFFE command sequence is addressed to respective RFFE slaves among the RFFE slaves 14(1)-14(M) associated with the specific GSID. For example, if the command sequence is communicated with GSID 0x6, then the command sequence will be addressed to the RFFE slaves associated with the GSID of 0x6. When an RFFE command sequence is communicated based on the BSID, all of the RFFE slaves 14(1)-14(M) on the RFFE bus 16 will be able to receive the RFFE command sequence.

However, not all communications require a two-wire serial bus like the RFFE bus 16. In some cases, a single-wire serial bus operating at a slower data rate may be sufficient or even desired for carrying out certain types of communications between circuits. In this regard, FIG. 2 is a schematic diagram of an exemplary SuBUS apparatus 22 in which a SuBUS bridge circuit 24 is configured to bridge communications between the RFFE master 12 in FIG. 1 with one or more SuBUS slaves 26(1)-26(N). Common elements between FIGS. 1 and 2 are shown therein with common element numbers and will not be re-described herein.

The SuBUS bridge circuit 24 is coupled to the SuBUS slaves 26(1)-26(N) over a SuBUS 28 having a single data wire 30. Accordingly, the SuBUS 28 is configured to operate at a slower data rate (also referred to as "second data rate" hereinafter) than the RFFE bus 16. The SuBUS bridge circuit 24 may be coupled to the RFFE master 12 via the RFFE bus 16. In this regard, the SuBUS bridge circuit 24 and the SuBUS slaves 26(1)-26(N) are also RFFE slaves, such as the RFFE slaves 14(1)-14(M), to the RFFE master 12 in the RFFE bus apparatus 10 of FIG. 1. In this regard, the SuBUS bridge circuit 24 and the SuBUS slaves 26(1)-26(N) are configured to be identified by the RFFE master 12 based on the fifteen (15) USIDs ranging from hexadecimal value 0x1 to hexadecimal value 0xF (0x1-0xF).

Notably, the SuBUS 28 differs from the RFFE bus 16 in several aspects. First, the RFFE bus 16 includes the data line 18 and the clock line 20, while the SuBUS 28 includes only the single data wire 30. Second, the SuBUS bridge circuit 24 is configured to communicate with the SuBUS slaves 26(1)-26(N) based on SuBUS command sequences, which may be compatible but different from the RFFE command sequences communicated over the RFFE bus 16. In this regard, the SuBUS bridge circuit 24 may perform command conversion between the RFFE command sequences and the SuBUS command sequences to facilitate communications between the RFFE bus 16 and the SuBUS 28. Third, the RFFE bus 16 may be configured to operate at the first data rate and the SuBUS 28 may be configured to operate at the second data rate slower than the first data rate. In this regard, the SuBUS bridge circuit 24 may buffer SuBUS data payloads prior to communicating over the RFFE bus 16 to help compensate for a difference between the first data rate and the second data rate. For more detailed information related to the SuBUS apparatus 22 of FIG. 2, please refer to U.S. Pat. No. 10,185,683 B2, entitled "BUS INTERFACE SYSTEM," U.S. Patent Application Publication Number 2015/0193298 A1, entitled "WRITE TECHNIQUE FOR A BUS INTERFACE SYSTEM," and U.S. Patent Application Publication Serial Number 2015/0193297 A1, entitled "READ TECHNIQUE FOR A BUS INTERFACE SYSTEM," the disclosures of which are incorporated herein by reference in their entireties.

Similar to the RFFE slaves 14(1)-14(M) in FIG. 1, the SuBUS bridge circuit 24 and the SuBUS slaves 26(1)-26(N) need to be respectively identified by a USID. As discussed in FIG. 1, the RFFE bus apparatus 10 can support fifteen (15) USIDs between hexadecimal value 0x1 and hexadecimal value 0xF (0x1-0xF). In this regard, the SuBUS bridge circuit 24 can be identified by a specially assigned USID among the 15 available USIDs and the SuBUS slaves 26(1)-26(N) can be identified by the remaining 14 USIDs excluding the specially assigned USID. For example, if the SuBUS bridge circuit 24 is identified by the specially assigned USID of 0x1, then the SuBUS slaves 26(1)-26(N) can only be identified by USIDs ranging from 0x2 to 0xF. Like the RFFE slaves 14(1)-14(M), the SuBUS slaves 26(1)-26(N) may also be accessed via BSID and GSID as previously described in FIG. 1.

The SuBUS apparatus 22 may be employed in combination with the RFFE bus apparatus 10 to enable flexible heterogeneous bus deployment in an electronic device (e.g., a smartphone). However, as discussed above, the RFFE bus 16 can only support up to 14 heterogeneous (e.g., RFEE and SuBUS) slaves based on 14 USIDs. In some cases, it may be necessary to support more than 14 heterogeneous slaves over the RFFE bus 16 in the electronic device. Accordingly, the RFFE specification further provides an option of having multiple RFFE buses and assigning RFFE slaves on separate RFFE buses with conflicting USIDs.

However, it may be challenging to incorporate additional RFFE buses in such space-constrained electronic devices as smartphones. First of all, to support each additional RFFE bus, the RFFE master 12 must provide two additional physical pins for connecting a data line like the data line 18 and a clock line like the clock line 20. This can be very difficult given that the RFFE master 12 can be a transceiver circuit that already has to provide a number of physical pins for connecting to a variety of components and/or circuits. Second, the RFFE master 12 and the SuBUS slaves 26(1)-26(N) may be located in different sections of an electronic device. For example, the RFFE master 12 can be located in a center of the electronic device, while the SuBUS bridge circuit 24 and/or the SuBUS slaves 26(1)-26(N) are placed close to edges of the electronic device. In this regard, it may be more complicated to make room for the additional RFFE bus and route the additional RFFE bus from the RFFE master 12 to the SuBUS bridge circuit 24 and/or the SuBUS slaves 26(1)-26(N). Hence, it may be desired to concurrently support more than 14 RFFE and SuBUS slaves in the electronic device without adding an additional RFFE bus.

SUMMARY

Aspects disclosed in the detailed description include a hybrid bus hub circuit and related apparatus. The bus hub circuit can be configured to bridge a radio frequency front-end (RFFE) bus with a number of auxiliary buses of different types. In examples discussed herein, the auxiliary buses include at least one RFFE auxiliary bus configured to support an RFFE slave(s) and at least one single-wire bus (SuBUS) configured to support a SuBUS slave(s). In one aspect, the hybrid bus hub circuit may be configured to forward an RFFE command sequence(s) received from the RFFE bus to the RFFE slave(s) and forward a RFFE data payload(s) received from the RFFE slave(s) to the RFFE bus. In another aspect, the hybrid bus hub circuit may be configured to perform command sequence conversion and/or data payload buffering to facilitate communications between the RFFE bus and the SuBUS slave(s). Each of the auxiliary buses may support a fixed number of slaves identified respectively by a unique slave identification (USID). The hybrid bus hub circuit can be configured to selectively activate an auxiliary bus(es) for communication with the RFFE bus, thus making it possible to reuse a same set of USIDs among the auxiliary buses without causing potential identification conflict. As such, it may be possible to support more slaves in an apparatus with a single RFFE bus. As a result, it may be possible to reduce pin count requirement for an RFFE master and/or enable flexible heterogeneous bus deployment in the apparatus.

In one aspect, a hybrid bus hub circuit is provided. The hybrid bus hub circuit includes a primary port coupled to an RFFE master via an RFFE bus. The hybrid bus hub circuit also includes at least one first auxiliary port coupled to at least one first slave via at least one first type auxiliary bus. The hybrid bus hub circuit also includes at least one second auxiliary port coupled to at least one second slave via at least one second type auxiliary bus. The first type auxiliary bus and the second type auxiliary bus are configured to be different types of auxiliary buses. The hybrid bus hub circuit also includes a hub controller. The hub controller is configured to receive a predefined RFFE command sequence corresponding to the hybrid bus hub circuit and configured to identify at least one selected auxiliary bus among the at least one first type auxiliary bus and the at least one second type auxiliary bus for communication with the RFFE master. The hub controller is also configured to activate at least one selected auxiliary port coupled to the at least one selected auxiliary bus among the at least one first auxiliary port and the at least one second auxiliary port in response to receiving the predefined RFFE command sequence.

In another aspect, an apparatus is provided. The apparatus includes an RFFE bus and an RFFE master coupled to the RFFE bus. The apparatus also includes at least one first type auxiliary bus and a number of first slaves coupled to the at least one first type auxiliary bus. The apparatus also includes at least one second type auxiliary bus and a number of second slaves coupled to the at least one second type auxiliary bus. The first type auxiliary bus and the second type auxiliary bus are configured to be different types of auxiliary buses. The apparatus also includes a hybrid bus hub circuit. The hybrid bus hub circuit includes a primary port coupled to the RFFE master via the RFFE bus. The hybrid bus hub circuit also includes at least one first auxiliary port coupled to the first slaves via the first type auxiliary bus. The hybrid bus hub circuit also includes at least one second auxiliary port coupled to the second slaves via the second type auxiliary bus. The hybrid bus hub circuit also includes a hub controller. The hub controller is configured to receive a predefined RFFE command sequence corresponding to the hybrid bus hub circuit and configured to identify at least one selected auxiliary bus among the at least one first type auxiliary bus and the at least one second type auxiliary bus for communication with the RFFE master. The hub controller is also configured to activate at least one selected auxiliary port coupled to the at least one selected auxiliary bus among the at least one first auxiliary port and the at least one second auxiliary port in response to receiving the predefined RFFE command sequence.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure and, together with the description, serve to explain the principles of the disclosure.

DETAILED DESCRIPTION

Figure 1:
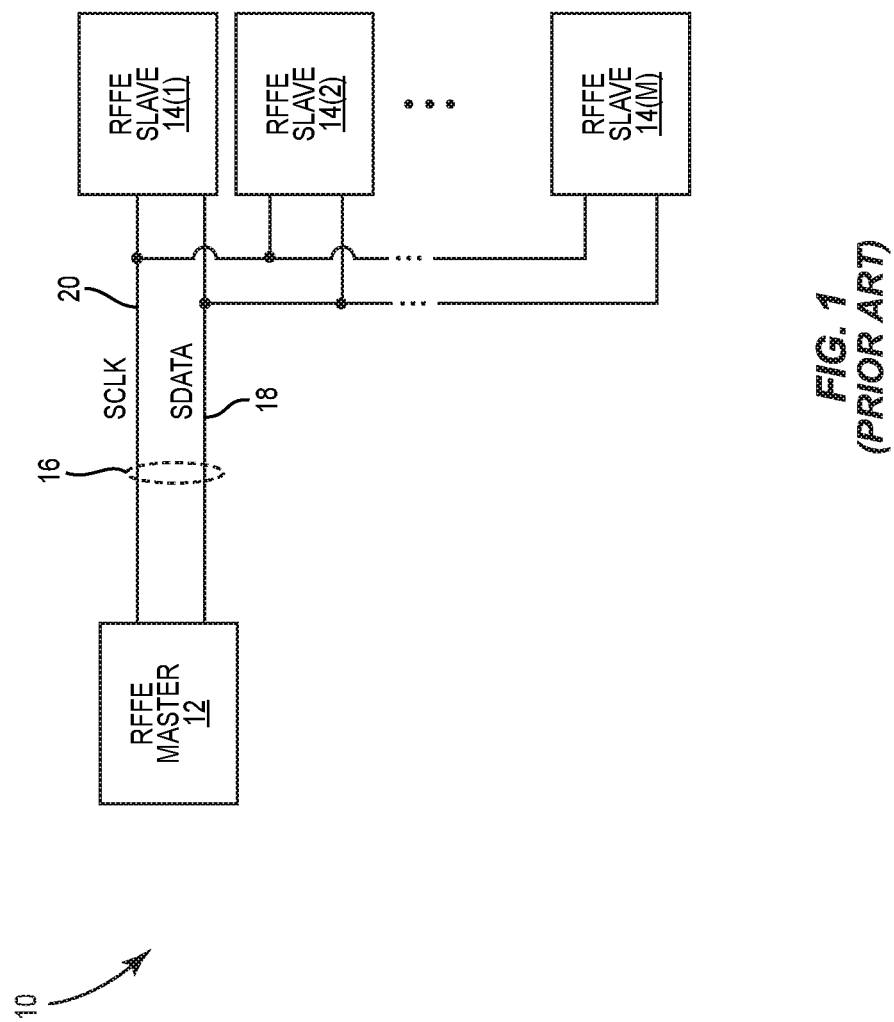
FIG. 1 is a schematic diagram of an exemplary radio frequency front-end (RFFE) bus apparatus as defined in the MIPI® alliance specification for radio frequency (RF) front-end control interface, version 2.1.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include a hybrid bus hub circuit and related apparatus. The bus hub circuit can be configured to bridge a radio frequency front-end (RFFE) bus with a number of auxiliary buses of different types. In examples discussed herein, the auxiliary buses include at least one RFFE auxiliary bus configured to support an RFFE slave(s) and at least one single-wire bus (SuBUS) configured to support a SuBUS slave(s). In one aspect, the hybrid bus hub circuit may be configured to forward an RFFE command sequence(s) received from the RFFE bus to the RFFE slave(s) and forward a RFFE data payload(s) received from the RFFE slave(s) to the RFFE bus. In another aspect, the hybrid bus hub circuit may be configured to perform command sequence conversion and/or data payload buffering to facilitate communications between the RFFE bus and the SuBUS slave(s). Each of the auxiliary buses may support a fixed number of slaves identified respectively by a unique slave identification (USID). The hybrid bus hub circuit can be configured to selectively activate an auxiliary bus(es) for communication with the RFFE bus, thus making it possible to reuse a same set of USIDs among the auxiliary buses without causing potential identification conflict. As such, it may be possible to support more slaves in an apparatus with a single RFFE bus. As a result, it may be possible to reduce pin count requirement for an RFFE master and/or enable flexible heterogeneous bus deployment in the apparatus.

Figure 2:
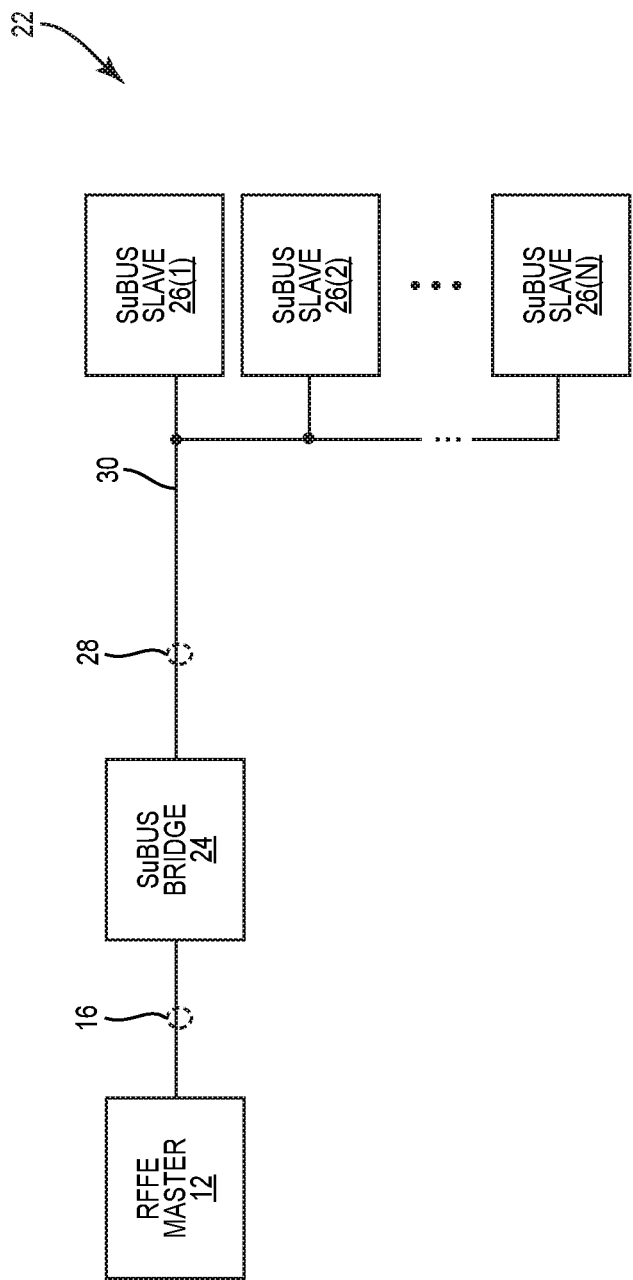
FIG. 2 is a schematic diagram of an exemplary single-wire bus (SuBUS) apparatus in which a SuBUS bridge circuit is configured to bridge communications between an RFFE master in the RFFE bus apparatus of FIG. 1 with a SuBUS slave(s) in the SuBUS apparatus.
Figure 3:
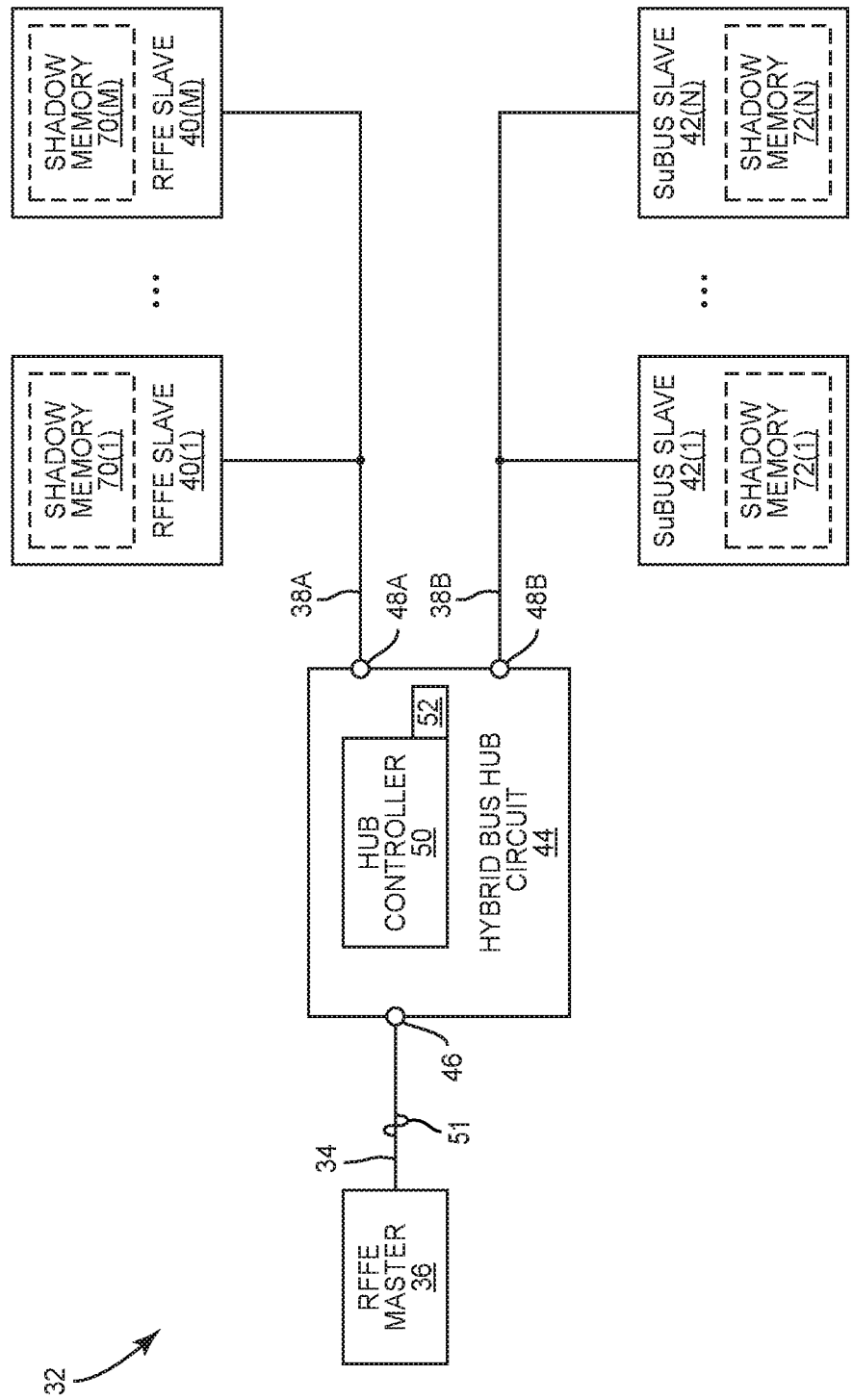
FIG. 3 is a schematic diagram of an exemplary apparatus that can be configured according to an embodiment of the present disclosure to support more heterogeneous (e.g., RFFE and SuBUS) slaves than the RFFE bus apparatus of FIG. 1 and the SuBUS apparatus of FIG. 2.

In this regard, FIG. 3 is a schematic diagram of an exemplary apparatus 32 that can be configured according to an embodiment of the present disclosure to support more heterogeneous (e.g., RFFE and SuBUS) slaves than the RFFE bus apparatus 10 of FIG. 1 and the SuBUS apparatus 22 of FIG. 2 can support. The apparatus 32 includes an RFFE bus 34, which is identical to the RFFE bus 16 in FIG. 1, and an RFFE master 36 coupled to the RFFE bus 34. Like the RFFE bus 16 in FIG. 1, the RFFE bus 34 is a two-wire serial bus that includes a data line (not shown) and a clock line (not shown) for communicating a bidirectional data signal SDATA and a clock signal SCLK, respectively. The apparatus 32 includes at least one first type auxiliary bus 38A and at least one second type auxiliary bus 38B. The first type auxiliary bus 38A and the second type auxiliary bus 38B are configured to be different types of auxiliary buses. In a non-limiting example, the first type auxiliary bus 38A is an RFFE auxiliary bus identical to the RFFE bus 34 and the second type auxiliary bus 38B is a SuBUS auxiliary bus identical to the SuBUS 28 in FIG. 2. In this regard, the first type auxiliary bus 38A includes at least two wires and is configured to operate at a first data rate. In contrast, the second type auxiliary bus 38B includes only one wire and is configured to operate at a second data rate slower than the first data rate. It should be appreciated that the first type auxiliary bus 38A and the second type auxiliary bus 38B can be any suitable communication buses in addition to the RFFE auxiliary bus and/or the SuBUS auxiliary bus.

The first type auxiliary bus 38A can be configured to support a number of first slaves 40(1)-40(M) and the second type auxiliary bus 38B can be configured to support a number of second slaves 42(1)-42(N). In a non-limiting example, the first slaves 40(1)-40(M) are RFFE slaves like the RFFE slaves 14(1)-14(M) in FIG. 1 and the second slaves 42(1)-42(N) are SuBUS slaves like the SuBUS slaves 26(1)-26(N) in FIG. 2. Notably, the first type auxiliary bus 38A and the second type auxiliary bus 38B can be configured to support equal or different numbers of slaves (e.g., M=N, M>N, or M<N).

The apparatus 32 includes a hybrid bus hub circuit 44 configured to bridge the RFFE bus 34 with the first type auxiliary bus 38A and the second type auxiliary bus 38B. The hybrid bus hub circuit 44 is coupled to the RFFE bus 34, and thus the RFFE master 36, via a primary port 46. The hybrid bus hub circuit 44 is also coupled to the first type auxiliary bus 38A, and thus the first slaves 40(1)-40(M), via at least one first auxiliary port 48A. The hybrid bus hub circuit 44 is further coupled to the second type auxiliary bus 38B, and thus the second slaves 42(1)-42(N), via at least one second auxiliary port 48B.

The hybrid bus hub circuit 44 can include a hub controller 50, which can be a microprocessor, a microcontroller, or a field-programmable gate array (FPGA), for example. The hub controller 50 is configured to receive a predefined RFFE command sequence 51 corresponding to the hybrid bus hub circuit 44 and configured to identify at least one selected auxiliary bus among the first type auxiliary bus 38A and the second type auxiliary bus 38B for communication with the RFFE master 36. In response to receiving the predefined RFFE command sequence 51, the hub controller 50 may selectively activate at least one selected auxiliary port among the first auxiliary port 48A and the second auxiliary port 48B that is coupled to the selected auxiliary bus identified in the predefined RFFE command sequence 51. Accordingly, the hybrid bus hub circuit 44 may bridge communications between the selected auxiliary bus and the RFFE master 36. In one example, the hybrid bus hub circuit 44 may receive an RFFE command sequence(s) (e.g., RFFE register-read, RFFE register-write, etc.) corresponding to the first type auxiliary bus 38A. In this regard, the hub controller 50 may simply activate the first auxiliary port 48A and forward the RFFE command sequence(s) to the first auxiliary port 48A. In another example, the hybrid bus hub circuit 44 may receive an RFFE command sequence(s) corresponding to the second type auxiliary bus 38B. In this regard, the hub controller 50 may activate the second auxiliary port 48B and convert the RFFE command sequence(s) into a SuBUS command sequence(s) before providing the SuBUS command sequence(s) to the second auxiliary port 48B.

Similar to the SuBUS bridge circuit 24 in FIG. 2, the hybrid bus hub circuit 44 may be identified by a specially assigned USID (e.g., 0x1). In this regard, the predefined RFFE command sequence 51 is said to be corresponding to the hybrid bus hub circuit 44 when the predefined RFFE command sequence 51 includes the specially assigned USID configured to identify the hybrid bus hub circuit 44.

In a non-limiting example, the hybrid bus hub circuit 44 can include a register map (REGMAP) 52 having at least one first control bit corresponding to the first type auxiliary bus 38A and at least one second control bit corresponding to the second type auxiliary bus 38B. In this regard, to configure the hybrid bus hub circuit 44 to activate the first type auxiliary bus 38A and deactivate the second type auxiliary bus 38B, the RFFE master 36 may use the predefined RFFE command sequence 51 to set the first control bit and the second control bit to binary value one (1) and zero (0), respectively. The hub controller 50 may read the first control bit and the second control bit from the REGMAP 52.

Accordingly, the hub controller 50 may activate the first auxiliary port 48A coupled to the first type auxiliary bus 38A and deactivate the second auxiliary port 48B coupled to the second type auxiliary bus 38B, either concurrently or sequentially. Likewise, the RFFE master 36 may also use the predefined RFFE command sequence 51 to set the first control bit and the second control bit to binary value 0 and 1, respectively, to deactivate the first type auxiliary bus 38A and activate the second type auxiliary bus 38B.

As mentioned earlier, the hybrid bus hub circuit 44 is identified by the specially assigned USID (e.g., 0x1). As such, the first slaves 40(1)-40(M) and the second slaves 42(1)-42(N) are configured to share the remaining 14 USIDs ranging from 0x2 to 0xF. Accordingly, each of the first type auxiliary bus 38A and the second type auxiliary bus 38B can support up to fourteen slaves (e.g., RFFE and SuBUS slaves). Thus, the first type auxiliary bus 38A and the second type auxiliary bus 38B may collectively support more heterogeneous slaves (e.g., up to twenty-eight) than each of the RFFE apparatus 10 of FIG. 1 and the SuBUS apparatus 22 of FIG. 2 can support.

Notably, it may be possible to support additional slaves (RFFE and/or SuBUS slaves) by connecting additional auxiliary buses (RFFE auxiliary buses and/or SuBUS auxiliary buses) to the hybrid bus hub circuit 44. In one example, the hybrid bus hub circuit 44 may be connected to an additional first type auxiliary bus(es) (not shown). As such, the hub controller 44 may be configured to bridge communications between the RFFE bus 34, the first type auxiliary bus 38A, and the additional first type auxiliary bus(es) in accordance to the mechanisms described in U.S. patent application Ser. No. 16/391,646, filed on Apr. 23, 2019. In another example, the hybrid bus hub circuit 44 may be connected to an additional second type auxiliary bus(es) (not shown). As such, the hub controller 44 may be configured to bridge communications between the RFFE bus 34, the second type auxiliary bus 38B, and the additional second type auxiliary bus(es) in accordance to the mechanisms described in U.S. patent application Ser. No. 16/414,007, filed May 16, 2019.

By employing the hybrid bus hub circuit 44 to bridge the RFFE bus 34 with the first type auxiliary bus 38A and the second type auxiliary bus 38B, the burden of providing additional physical pins by the RFFE master 36 may be lifted. As such, it may be possible to reduce the footprint of the RFFE master 36 and/or to reconfigure available physical pins for other purposes. In a non-limiting example, the hybrid bus hub circuit 44 can be provided in close proximity to the first slaves 40(1)-40(M) or the second slaves 42(1)-42(N). By placing the hybrid bus hub circuit 44 in close proximity to the first slaves 40(1)-40(M), each of the first slaves 40(1)-40(M) can have a shorter coupling distance to the hybrid bus hub circuit 44 than to the RFFE master 36. Likewise, by placing the hybrid bus hub circuit 44 in close proximity to the second slaves 42(1)-42(N), each of the second slaves 42(1)-42(M) can have a shorter coupling distance to the hybrid bus hub circuit 44 than to the RFFE master 36. As such, it may be possible to route the first type auxiliary bus 38A or the second type auxiliary bus 38B locally to the hybrid bus hub circuit 44, thus helping to reduce design complexity of the apparatus 32.

Figure 4:
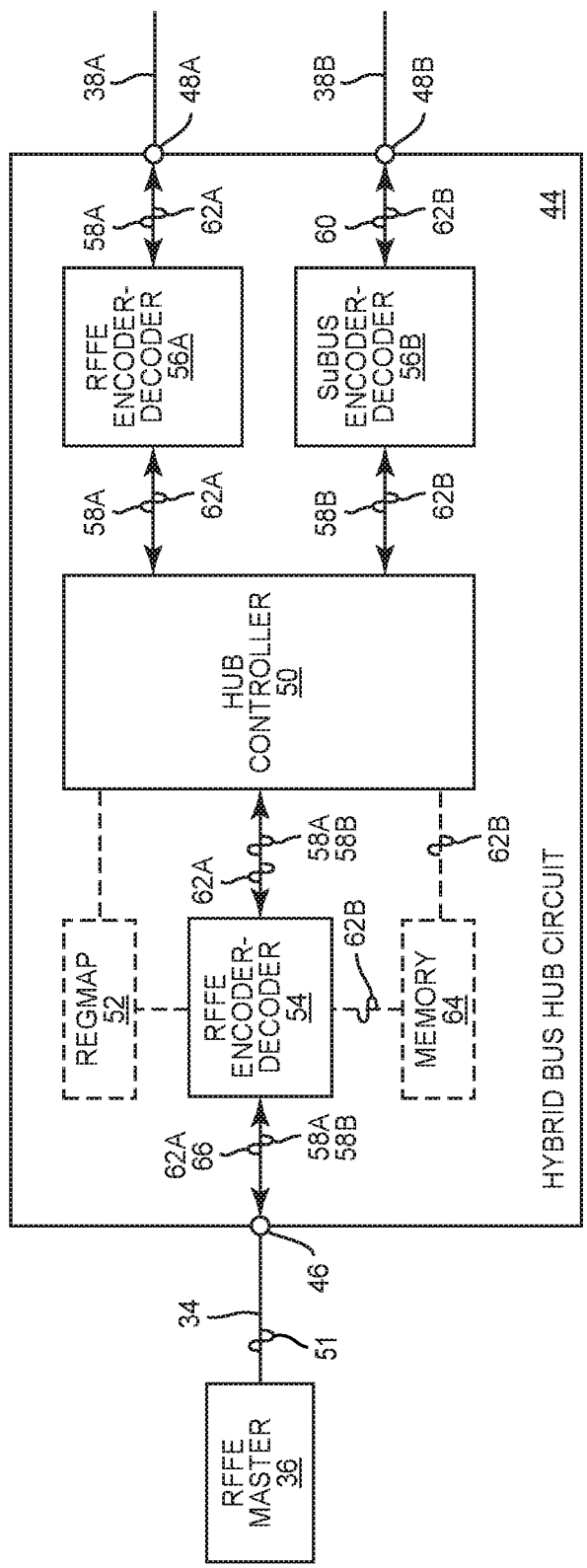
FIG. 4 is a schematic diagram providing an exemplary illustration of a hybrid bus hub circuit in the apparatus of FIG. 3 configured according to an embodiment of the present disclosure.

FIG. 4 is a schematic diagram providing an exemplary illustration of the hybrid bus hub circuit 44 of FIG. 3 configured according to an embodiment of the present disclosure. Common elements between FIGS. 3 and 4 are shown therein with common element numbers and will not be re-described herein.

In a non-limiting example, the hybrid bus hub circuit 44 can include a master encoder-decoder 54 (denoted as "RFFE Encoder-Decoder"), at least one first auxiliary encoder-decoder 56A (denoted as "RFFE Encoder-Decoder"), and at least one second auxiliary encoder-decoder 56B (denoted as "SuBUS Encoder-Decoder"). The master encoder-decoder 54 is coupled between the primary port 46 and the hub controller 50. The first auxiliary encoder-decoder 56A is coupled between the hub controller 50 and the first auxiliary port 48A. The second auxiliary encoder-decoder 56B is coupled between the hub controller 50 and the second auxiliary port 48B.

The master encoder-decoder 54 may be configured to decode a first RFFE command sequence(s) 58A (e.g., register-write, register-read, register-poll, etc.) corresponding to the first type auxiliary bus 38A and a second RFFE command sequence(s) 58B (e.g., register-write, register-read, register-poll, etc.) corresponding to the second type auxiliary bus 38B. The master encoder-decoder 54 may also be configured to decode the predefined RFFE command sequence 51 corresponding to the hybrid bus hub circuit 44 and configured to identify the selected auxiliary bus among the first type auxiliary bus 38A and the second type auxiliary bus 38B for communication with the RFFE master 36. Accordingly, the master encoder-decoder 54 may cause the first control bit and the second control bit in the REGMAP 52 to be set based on the predefined RFFE command sequence 51. Subsequently, the hub controller 50 may read the first control bit and the second control bit from the REGMAP 52 and selectively activate the first auxiliary port 48A and/or the second auxiliary port 48B accordingly.

The hub controller 50 may forward the first RFFE command sequence(s) 58A and the second RFFE command sequence(s) 58B to the first auxiliary encoder-decoder 56A and the second auxiliary encoder-decoder 56B, respectively. The first auxiliary encoder-decoder 56A may be configured to forward the first RFFE command sequence(s) 58A directly to the first auxiliary port 48A. In contrast, the second auxiliary encoder-decoder 56B may be configured to convert the second RFFE command sequence(s) 58B into a SuBUS command sequence(s) 60 and provide the SuBUS command sequence(s) 60 to the second type auxiliary bus 38B.

The first auxiliary encoder-decoder 56A may be configured to decode an RFFE data payload(s) 62A received via the first auxiliary port 48A and provide the RFFE data payload(s) 62A to the hub controller 50. The hub controller 50 may be configured to forward the RFFE data payload(s) 62A directly to the master encoder-decoder 54, which will provide the RFFE data payload(s) 62A directly to the primary port 46. The second auxiliary encoder-decoder 56B may be configured to decode a SuBUS data payload(s) 62B received via the second auxiliary port 48B and provide the second SuBUS data payload(s) 62B to the hub controller 50. The hub controller 50 may store the second SuBUS data payload(s) 62B in a mirror memory 64 (denoted as "memory"). As mentioned earlier, the second type auxiliary bus 38B may operate at the second data rate slower than the first data rate of the RFFE bus 34. As such, by storing the SuBUS data payload(s) 62B in the mirror memory 64, it may be possible to compensate for the difference between the first data rate and the second data rate.

The RFFE master 36 may communicate an RFFE register-read command sequence, for example in the second RFFE command sequence(s) 58B, to the hybrid bus hub circuit 44 to retrieve the SuBUS data payload(s) 62B stored in the mirror memory 64. In response to receiving the RFFE register-read command sequence 58B, the hub controller 50 may cause the master encoder-decoder 54 to encode the SuBUS data payload(s) 62B into an RFFE data payload(s) 66. Subsequently, the master encoder-decoder 54 may provide the RFFE data payload(s) 66 to the RFFE master 36 via the RFFE bus 34.

Specific non-limiting working examples of the apparatus 32 of FIG. 3 are now discussed with reference to FIGS. 5, 6, 7, 8A, and 8B below. Common elements between FIGS. 3, 4, 5, 6, 7, 8A, and 8B are shown therein with common element numbers and will not be re-described herein.

Figure 5:
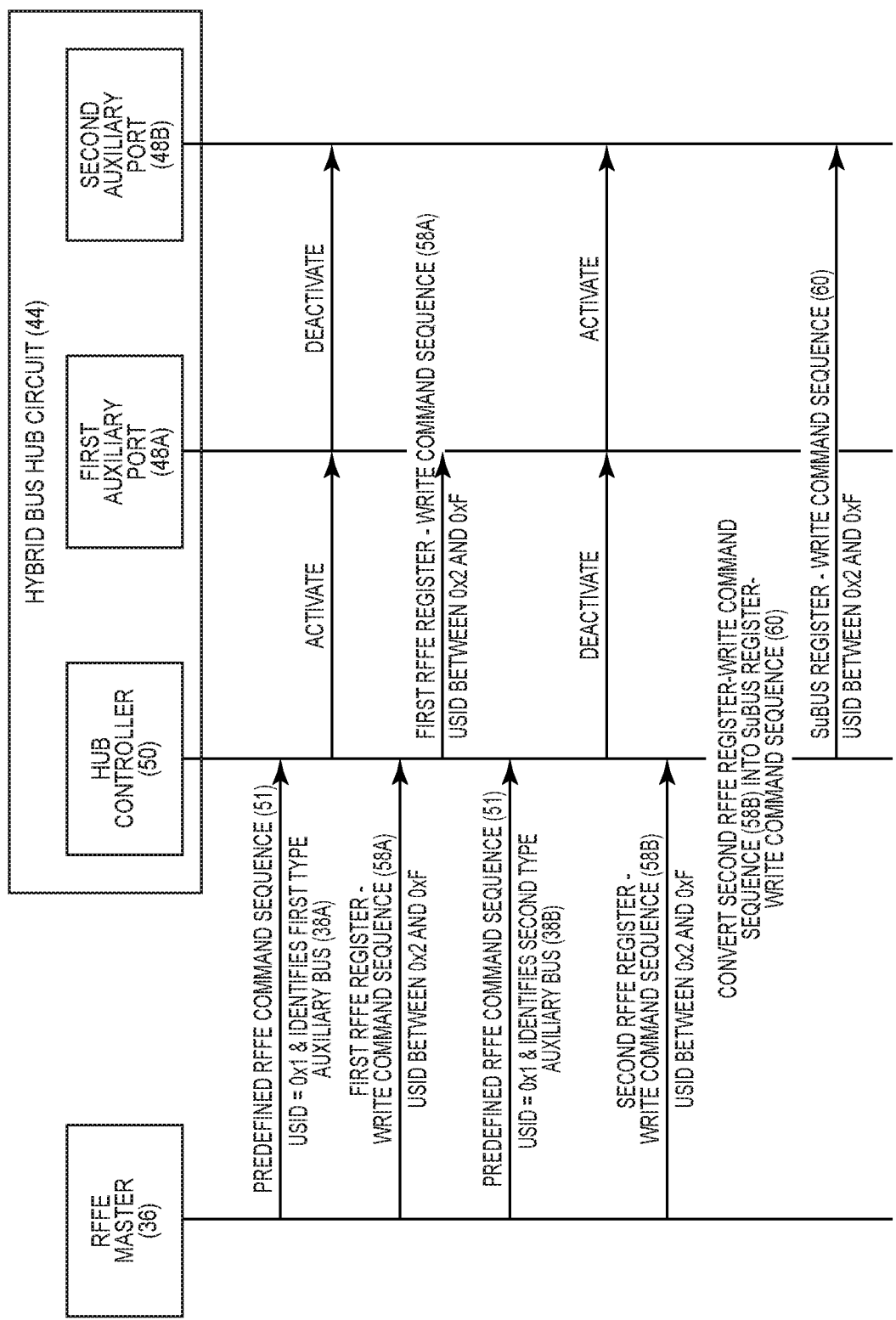
FIG. 5 is a flow diagram providing an exemplary illustration of the apparatus of FIG. 3 configured to write alternately to a pair of auxiliary buses of different types.

In this regard, FIG. 5 is a flow diagram 68 providing an exemplary illustration of the apparatus 32 of FIG. 3 configured to write alternately to the first type auxiliary bus 38A and the second type auxiliary bus 38B.

The hub controller 50 is configured to receive the predefined RFFE command sequence 51 associated with the specially assigned USID (e.g., USID=0x1) and configured to identify the first type auxiliary bus 38A. The predefined RFFE command sequence 51 identifying the first type auxiliary bus 38A can cause the first control bit and the second control bit in the REGMAP 52 to be updated accordingly. Based on the first control bit and the second control bit in the REGMAP 52, the hub controller 50 activates the first auxiliary port 48A and deactivates the second auxiliary port 48B, either concurrently or sequentially. At this point, the hub controller 50 is ready to bridge communications between the RFFE master 36 and any of the first slaves 40(1)-40(M) on the first type auxiliary bus 38A.

The hub controller 50 receives the first RFFE command sequence 58A, which may be a first RFFE register-write command sequence 58A, corresponding to a selected first slave among the first slaves 40(1)-40(M). In this regard, the first RFFE command sequence 58A can be associated with any USID between 0x2 and 0xF. Accordingly, the hub controller 50 may forward the first RFFE register-write command sequence 58A to the first auxiliary port 48A for communication to the selected first slave on the first type auxiliary bus 38A.

The hub controller 50 may then receive the predefined RFFE command sequence 51 associated with the specially assigned USID (e.g., USID=0x1) and configured to identify the second type auxiliary bus 38B. The predefined RFFE command sequence 51 identifying the second type auxiliary bus 38B can cause the first control bit and the second control bit in the REGMAP 52 to be updated accordingly. Based on the first control bit and the second control bit in the REGMAP 52, the hub controller 50 activates the second auxiliary port 48B and deactivates the first auxiliary port 48A, either concurrently or sequentially. At this point, the hub controller 50 is ready to bridge communications between the RFFE master 36 to communicate with any of the second slaves 42(1)-42(N) on the second type auxiliary bus 38B.

Subsequently, the RFFE master 36 communicates a second RFFE register-write command sequence(s) 58B that identifies a selected second slave among the second slaves 42(1)-42(N) based on a USID (e.g., between 0x2 and 0xF). The hub controller 50 may be configured to convert the second RFFE register-write command sequence(s) 58B into a SuBUS register-write command sequence(s) 60 and provide the SuBUS register-write command sequence(s) 60 to the second auxiliary port 48B.

With reference back to FIG. 3, the first slaves 40(1)-40(M) may include first shadow memories 70(1)-70(M) for storing configuration parameters related to the first slaves 40(1)-40(M), respectively. Likewise, the second slaves 42(1)-42(N) may include second shadow memories 72(1)-72(N) for storing configuration parameters related to the second slaves 42(1)-42(N), respectively. As such, it may be possible to program the first shadow memories 70(1)-70(M) and/or the second shadow memories 72(1)-72(N) via an RFFE register-write command sequence(s).

Figure 6:
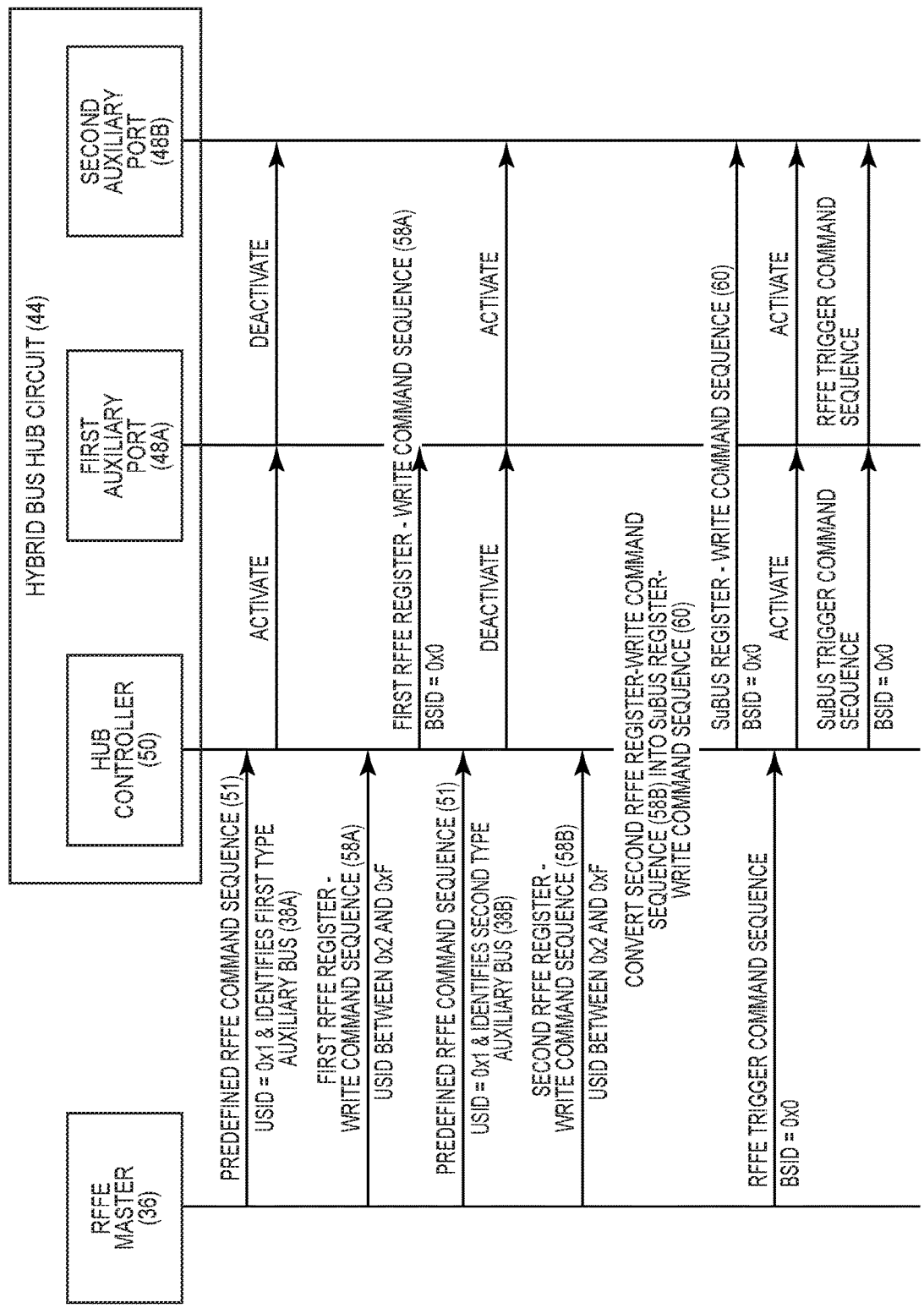
FIG. 6 is a flow diagram providing an exemplary illustration of the apparatus of FIG. 3 configured to write concurrently to a pair of auxiliary buses of different types based on a broadcast slave identification (BSID)

In this regard, FIG. 6 is a flow diagram 74 providing an exemplary illustration of the apparatus 32 of FIG. 3 configured to write concurrently to the first type auxiliary bus 38A and the second type auxiliary bus 38B based on a BSID. The hub controller 50 is configured to receive the predefined RFFE command sequence 51 associated with the specially assigned USID (e.g., USID=0x1) and identifies the first type auxiliary bus 38A. The predefined RFFE command sequence identifying the first type auxiliary bus 38A can cause the first control bit and the second control bit in the REGMAP 52 to be updated accordingly. Based on the first control bit and the second control bit in the REGMAP 52, the hub controller 50 activates the first auxiliary port 48A and deactivates the second auxiliary port 48B, either concurrently or sequentially. At this point, the hub controller 50 is ready to bridge communications between the RFFE master 36 to communicate with any of the first slaves 40(1)-40(M) on the first type auxiliary bus 38A.

Subsequently, the RFFE master 36 communicates a first RFFE register-write command sequence(s) 58A that identifies all of the first slaves 40(1)-40(M) based on a USID(s) (e.g., between 0x2 and 0xF). The hub controller 50 may be configured to store the first RFFE register-write command sequence(s) 58A in the first shadow memories 70(1)-70(M) via the first auxiliary port 48A.

The hub controller 50 may then receive the predefined RFFE command sequence 51 associated with the specially assigned USID (e.g., USID=0x1) and identifies the second type auxiliary bus 38B. The predefined RFFE command sequence 51 identifying the second type auxiliary bus 38B can cause the first control bit and the second control bit in the REGMAP 52 to be updated accordingly. Based on the first control bit and the second control bit in the REGMAP 52, the hub controller 50 activates the second auxiliary port 48B and deactivates the first auxiliary port 48A, either concurrently or sequentially. At this point, the hub controller 50 is ready to bridge communications between the RFFE master 36 to communicate with any of the second slaves 42(1)-42(N) on the second type auxiliary bus 38B.

Subsequently, the RFFE master 36 communicates a second RFFE register-write command sequence(s) 58B that identifies all of the second slaves 42(1)-42(N) based on a USID(s) (e.g., between 0x2 and 0xF). The hub controller 50 may be configured to convert the second RFFE register-write command sequence(s) 58B into a SuBUS register-write command sequence(s) 60 and store the SuBUS register-write command sequence(s) 60 in the second shadow memories 72(1)-72(N) via the second auxiliary port 48B.

The hub controller 50 may then receive an RFFE trigger command sequence(s) associated with the BSID from the RFFE master 36. In response to receiving the RFFE trigger command sequence(s), the hub controller 50 is configured to activate both the first auxiliary port 48A and the second auxiliary port 48B, either concurrently or sequentially. The hub controller 50 may convert the RFFE trigger command sequence(s) into a SuBUS trigger command sequence(s) associated with the BSID. Subsequently, the hub controller 50 may provide the RFFE trigger command sequence(s) and the SuBUS trigger command sequence(s) to the first auxiliary port 48A and the second auxiliary port 48B, respectively. The RFFE trigger command sequence(s) may cause the first slaves 40(1)-40(M) to be updated based on the first shadow memories 70(1)-70(M), respectively. Likewise, the SuBUS trigger command sequence(s) may cause the second slaves 42(1)-42(N) to be updated based on the second shadow memories 72(1)-72(N), respectively.

Figure 7:
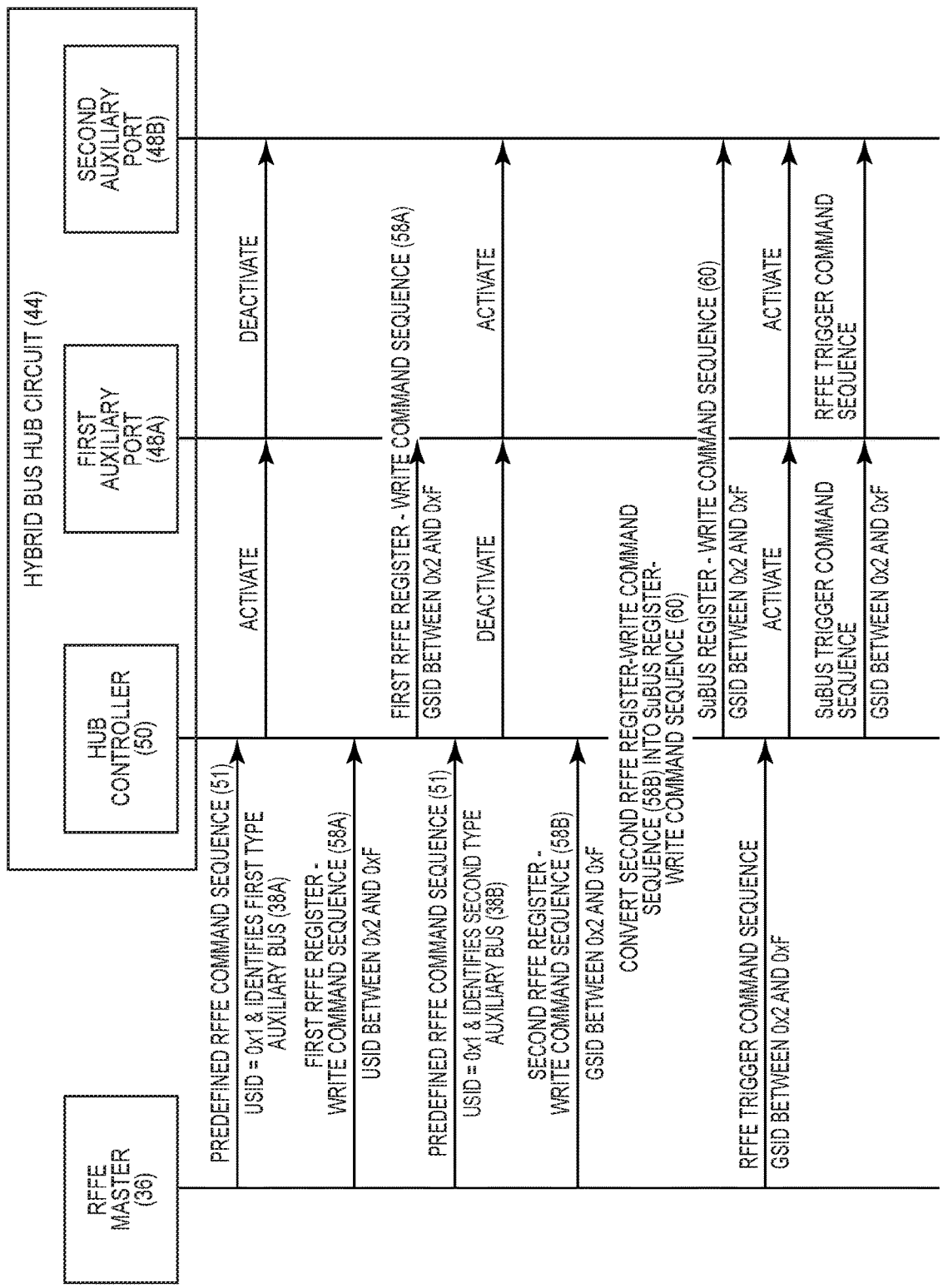
FIG. 7 is a flow diagram providing an exemplary illustration of the apparatus of FIG. 3 configured to write concurrently to a pair of auxiliary buses of different types based on a group slave identification (GSID)

In contrast to updating all of the first slaves 40(1)-40(M) and all of the second slaves 42(1)-42(N) based on the RFFE trigger command sequence(s) associated with the BSID, it may also be possible to update some of the first slaves 40(1)-40(M) and/or some of the second slaves 42(1)-42(N) based on GSIDs. In this regard, FIG. 7 is a flow diagram 76 providing an exemplary illustration of the apparatus 32 of FIG. 3 configured to write concurrently to the first type auxiliary bus 38A and the second type auxiliary bus 38B based on a GSID.

The hub controller 50 is configured to receive the predefined RFFE command sequence 51 associated with the specially assigned USID (e.g., USID=0x1) and identifies the first type auxiliary bus 38A. The predefined RFFE command sequence 51 identifying the first type auxiliary bus 38A can cause the first control bit and the second control bit in the REGMAP 52 to be updated accordingly. Based on the first control bit and the second control bit in the REGMAP 52, the hub controller 50 activates the first auxiliary port 48A and deactivates the second auxiliary port 48B, either concurrently or sequentially. At this point, the hub controller 50 is ready to bridge communications between the RFFE master 36 to communicate with any of the first slaves 40(1)-40(M) on the first type auxiliary bus 38A.

Subsequently, the RFFE master 36 communicates a first RFFE register-write command sequence(s) 58A that identifies one or more selected first slaves among the first slaves 40(1)-40(M) based on a USID(s) (e.g., between 0x2 and 0xF). The hub controller 50 may be configured to store the first RFFE register-write command sequence 58A in one or more selected shadow memories among the first shadow memories 70(1)-70(M) via the first auxiliary port 48A.

The hub controller 50 may then receive the predefined RFFE command sequence 51 associated with the specially assigned USID (e.g., USID=0x1) and identifies the second type auxiliary bus 38B. The predefined RFFE command sequence 51 identifying the second type auxiliary bus 38B can cause the first control bit and the second control bit in the REGMAP 52 to be updated accordingly. Based on the first control bit and the second control bit in the REGMAP 52, the hub controller 50 activates the second auxiliary port 48B and deactivates the first auxiliary port 48A, either concurrently or sequentially. At this point, the hub controller 50 is ready to bridge communications between the RFFE master 36 to communicate with any of the second slaves 42(1)-42(N) on the second type auxiliary bus 38B.

Subsequently, the RFFE master 36 communicates a second RFFE register-write command sequence(s) 58B that identifies one or more selected second slaves among the second slaves 42(1)-42(N) based on a GSID (e.g., between 0x2 and 0xF). The hub controller 50 may be configured to convert the second RFFE register-write command sequence(s) 58B into a SuBUS register-write command sequence(s) 60 and store the SuBUS register-write command sequence(s) 60 in one or more selected shadow memories among the second shadow memories 72(1)-72(N) via the second auxiliary port 48B.

The hub controller 50 may then receive an RFFE trigger command sequence(s) associated with the GSID from the RFFE master 36. In response to receiving the RFFE trigger command sequence(s), the hub controller 50 is configured to activate both the first auxiliary port 48A and the second auxiliary port 48B, either concurrently or sequentially. Subsequently, the hub controller 50 may convert the RFFE trigger command sequence(s) into a SuBUS trigger command sequence(s) associated with the GSID. Accordingly, the hub controller 50 may provide the RFFE trigger command sequence(s) and the SuBUS trigger command sequence to the first auxiliary port 48A and the second auxiliary port 48B, respectively. The RFFE trigger command sequence(s) causes the selected first slaves to be updated based on the selected first shadow memories 70(1)-70(M), respectively. Likewise, the SuBUS trigger command sequence(s) causes the selected second slaves to be updated based on the selected second shadow memories, respectively.

Figure 8A:
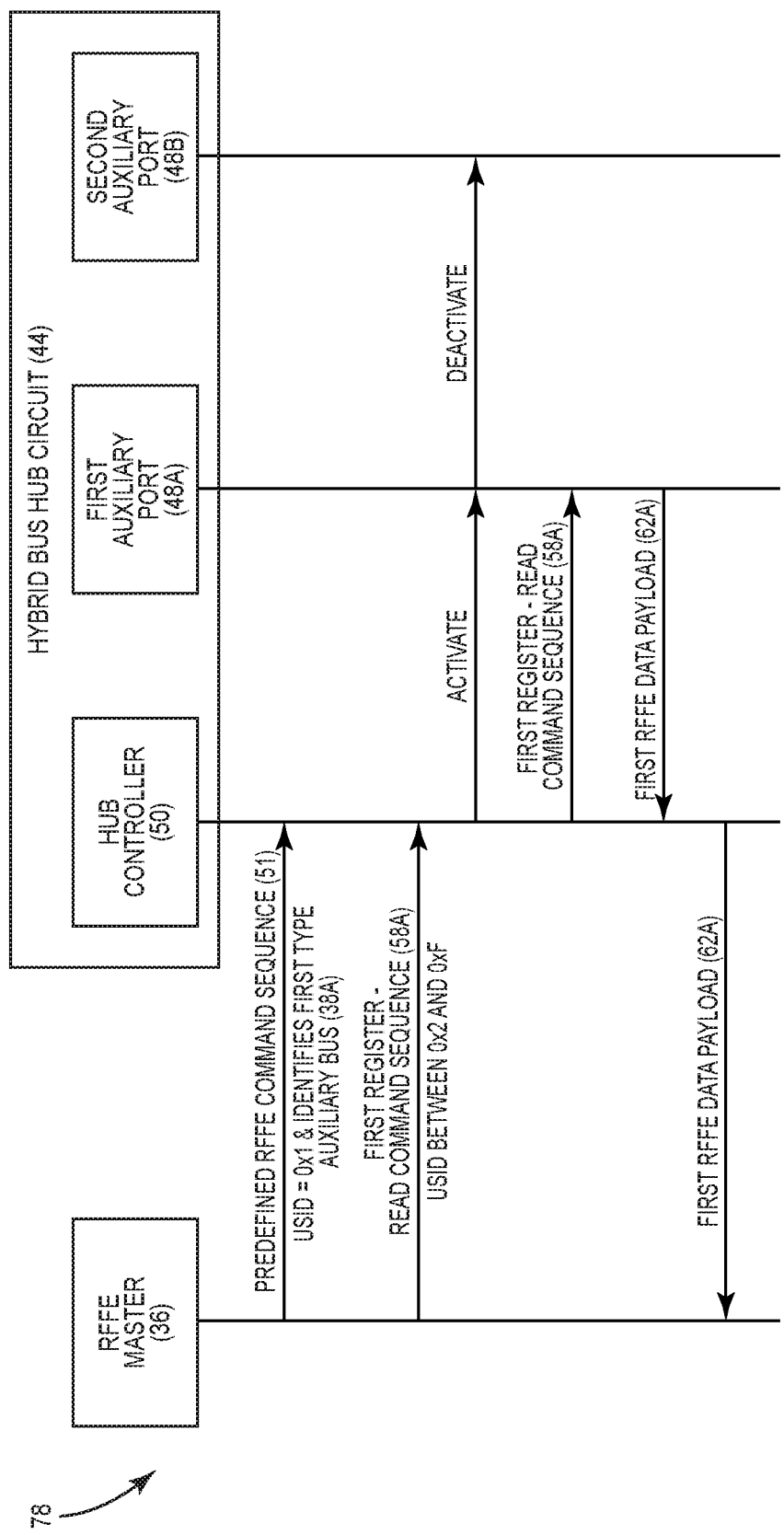
FIGS. 8A and 8B correspond to a flow diagram providing an exemplary illustration of the apparatus of FIG. 3 configured to read alternately from a pair of auxiliary buses of different types.
Figure 8B:
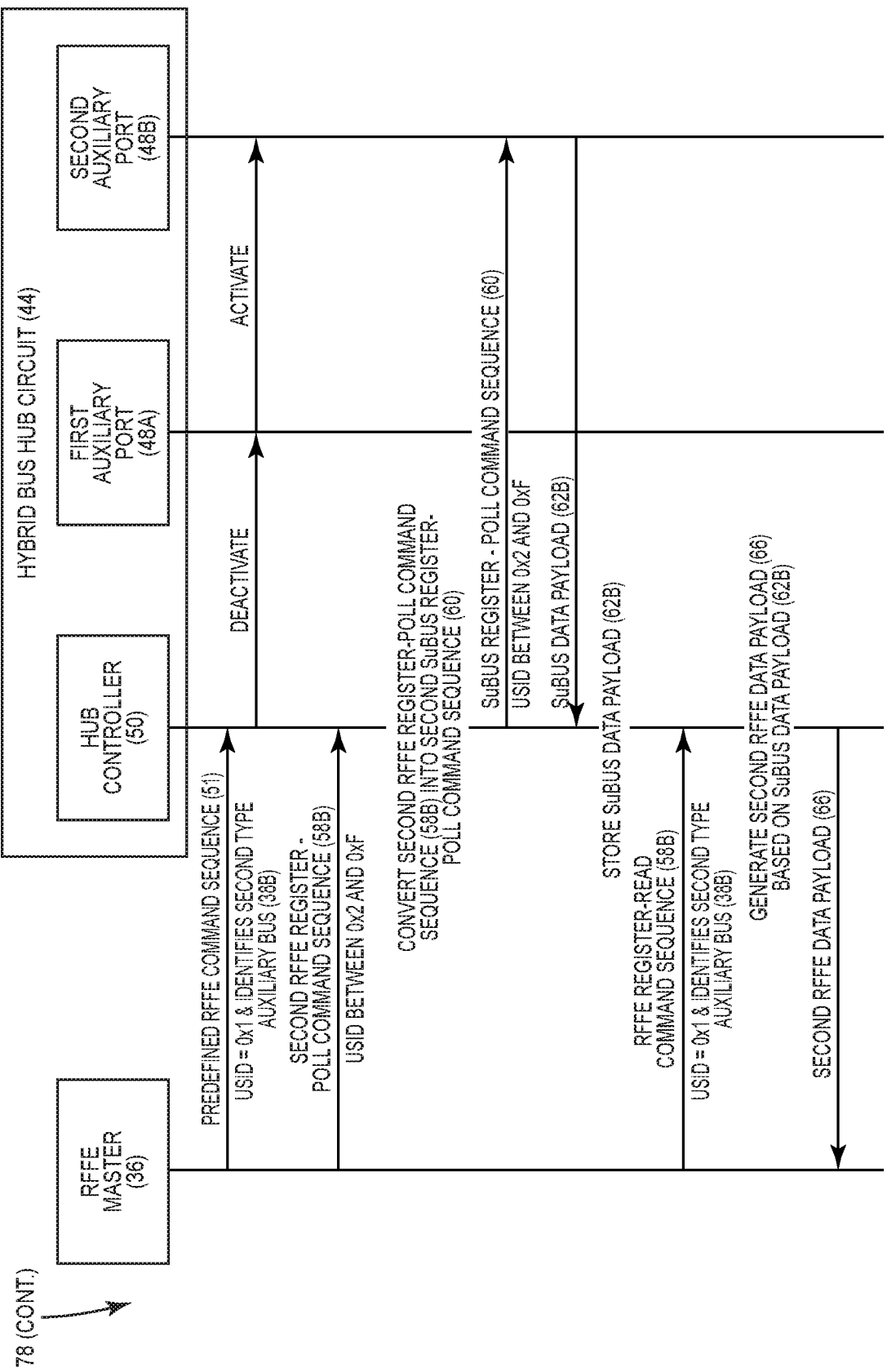

FIGS. 8A and 8B correspond to a flow diagram 78 providing an exemplary illustration of the apparatus 32 of FIG. 3 and FIG. 4 configured to read alternately from the first type auxiliary bus 38A and the second type auxiliary bus 38B. With reference to FIG. 8A, the hub controller 50 receives the predefined RFFE command sequence 51 associated with the specially assigned USID (e.g., USID=0x1) and identifies the first type auxiliary bus 38A. The predefined RFFE command sequence 51 identifying the first type auxiliary bus 38A can cause the first control bit and the second control bit in the REGMAP 52 to be updated accordingly. Based on the first control bit and the second control bit in the REGMAP 52, the hub controller 50 activates the first auxiliary port 48A and deactivates the second auxiliary port 48B, either concurrently or sequentially. At this point, the hub controller 50 is ready to bridge communications between the RFFE master 36 to communicate with any of the first slaves 40(1)-40(M) on the first type auxiliary bus 38A.

Subsequently, the RFFE master 36 communicates an RFFE register-read command sequence(s) 58A that identifies a selected first slave among the first slaves 40(1)-40(M) based on a USID(s) (e.g., between 0x2 and 0xF). The hub controller 50 may be configured to provide the RFFE register-read command sequence(s) 58A to the first auxiliary port 48A. The selected first slave may then provide a first RFFE data payload(s) 62A to the hub controller 50 via the first auxiliary port 48A. The hub controller 50 may be configured to forward the first RFFE data payload(s) 62A directly to the primary port 46.

With reference to FIG. 8B, the hub controller 50 receives the predefined RFFE command sequence 51 associated with the specially assigned USID (e.g., USID=0x1) and identifies the second type auxiliary bus 38B. The predefined RFFE command sequence 51 identifying the second type auxiliary bus 38B can cause the first control bit and the second control bit in the REGMAP 52 to be updated accordingly. Based on the first control bit and the second control bit in the REGMAP 52, the hub controller 50 activates the second auxiliary port 48B and deactivates the first auxiliary port 48A, either concurrently or sequentially. At this point, the hub controller 50 is ready to bridge communications between the RFFE master 36 to communicate with any of the second slaves 42(1)-42(N) on the second type auxiliary bus 38B.

Subsequently, the RFFE master 36 communicates an RFFE register-poll command sequence(s) 58B that identifies a selected second slave among the second slaves 42(1)-42(N) based on a USID(s) (e.g., between 0x2 and 0xF). The hub controller 50 may be configured to convert the RFFE register-poll command sequence(s) 58B into a SuBUS register-poll command sequence(s) 60 and provide the SuBUS register-poll command sequence(s) 60 to the second auxiliary port 48B.

The selected second slave may then provide a SuBUS data payload(s) 62B to the hub controller 50 via the second auxiliary port 48B. The hub controller 50 may store the SuBUS data payload(s) 62B in the mirror memory 64. Subsequently, the RFFE master 36 may provide a second RFFE register-read command sequence(s) 58B to the hub controller 50. In response, the hub controller 50 generates a second RFFE data payload(s) 66 based on the SuBUS data payload(s) 62B stored in the mirror memory 64. Subsequently, the hub controller 50 may provide the second RFFE data payload(s) 66 to the RFFE master 36.

Notably, FIGS. 5, 6, 7, 8A, and 8B provide exemplary illustrations of the RFFE master 36 communicating first with the first type auxiliary bus 38A and subsequently with the second type auxiliary bus 38B. It should be appreciated that the RFFE master 36 can be configured to communication with the first type auxiliary bus 38A and the second type auxiliary bus 38B in any sequence without altering operational principles and/or results as discussed in reference to FIGS. 5, 6, 7, 8A, and 8B.

Those skilled in the art will recognize improvements and modifications to the embodiments of the present disclosure. All such improvements and modifications are considered within the scope of the concepts disclosed herein and the claims that follow.

What is claimed is:

1. A hybrid bus hub circuit comprising:
a primary port coupled to an RFFE master via an RFFE bus;
at least one first auxiliary port coupled to at least one first slave via at least one first type auxiliary bus comprising multiple wires;
at least one second auxiliary port coupled to at least one second slave via at least one second type auxiliary bus consisting of one wire, wherein the at least one first type auxiliary bus and the at least one second type auxiliary bus are configured to be different types of auxiliary buses; and
a hub controller configured to:
receive a predefined RFFE command sequence identifying the hybrid bus hub circuit and comprising at least one indication configured to identify at least one selected auxiliary bus among the at least one first type auxiliary bus and the at least one second type auxiliary bus for communication with the RFFE master;
activate the at least one first type auxiliary bus and deactivate the at least one second type auxiliary bus in response to receiving the at least one indication that identifies the at least one first type auxiliary bus; and
activate the at least one second type auxiliary bus and deactivate the at least one first type auxiliary bus in response to receiving the at least one indication that identifies the at least one second type auxiliary bus.

2. The hybrid bus hub circuit of claim 1 configured to be identified by a specially assigned unique slave identification (USID) between hexadecimal value one (0x1) and hexadecimal value fifteen (0xF), wherein the hub controller is further configured to activate one of the at least one first auxiliary port and the at least one second auxiliary port in response to receiving the predefined RFFE command sequence comprising the specially assigned USID.

3. The hybrid bus hub circuit of claim 2 wherein each of the at least one first type auxiliary bus and the at least one second type auxiliary bus is configured to support a plurality of USIDs between hexadecimal value one (0x1) and hexadecimal value fifteen (0xF) excluding the specially assigned USID.

4. The hybrid bus hub circuit of claim 1 wherein:
the at least one first type auxiliary bus comprises at least one RFFE bus comprising at least two wires and configured to communicate RFFE command sequences and data payloads at a first data rate; and
the at least one second type auxiliary bus comprises a single-wire bus (SuBUS) consisting of only one wire and configured to communicate SuBUS command sequences and data payloads at a second data rate different from the first data rate.

5. The hybrid bus hub circuit of claim 4 wherein the hub controller is further configured to:
receive at least one RFFE register-write command sequence identifying the at least one first type auxiliary bus from the primary port; and
forward the at least one RFFE register-write command sequence to the at least one first auxiliary port.

6. The hybrid bus hub circuit of claim 4 wherein the hub controller is further configured to:
receive at least one RFFE register-write command sequence identifying the at least one second type auxiliary bus via the primary port;
convert the at least one RFFE register-write command sequence to at least one SuBUS register-write command sequence; and
provide the at least one SuBUS register-write command sequence to the at least one second auxiliary port.

7. The hybrid bus hub circuit of claim 4 wherein the hub controller is further configured to:
receive at least one RFFE register-read command sequence identifying the at least one first type auxiliary bus from the primary port; and
forward the at least one RFFE register-read command sequence to the at least one first auxiliary port.

8. The hybrid bus hub circuit of claim 7 wherein the hub controller is further configured to:
receive at least one RFFE data payload from the at least one first auxiliary port; and
forward the at least one RFFE data payload to the primary port.

9. The hybrid bus hub circuit of claim 4 wherein the hub controller is further configured to:
receive at least one RFFE register-poll command sequence identifying the at least one second type auxiliary bus via the primary port;
convert the at least one RFFE register-poll command sequence into at least one SuBUS register-poll command sequence;
provide the at least one SuBUS register-poll command sequence to the at least one second auxiliary port;
receive at least one SuBUS data payload via the at least one second auxiliary port; and
store the at least one SuBUS data payload received via the at least one second auxiliary port.

10. The hybrid bus hub circuit of claim 9 wherein the hub controller is further configured to:
receive at least one RFFE register-read command sequence corresponding to the hybrid bus hub circuit;
generate at least one RFFE data payload based on the at least one stored SuBUS data payload; and
provide the at least one RFFE data payload to the primary port.

11. The hybrid bus hub circuit of claim 10 wherein the hub controller is further configured to store the at least one SuBUS data payload prior to generating the at least one RFFE data payload to compensate for a difference between the first data rate and the second data rate.

12. An apparatus comprising:
an RFFE bus and an RFFE master coupled to the RFFE bus;
at least one first type auxiliary bus and a plurality of first slaves coupled to the at least one first type auxiliary bus comprising multiple wires;
at least one second type auxiliary bus and a plurality of second slaves coupled to the at least one second type auxiliary bus consisting of one wire, wherein the at least one first type auxiliary bus and the at least one second type auxiliary bus are configured to be different types of auxiliary buses; and
a hybrid bus hub circuit comprising:
a primary port coupled to the RFFE master via the RFFE bus;
at least one first auxiliary port coupled to the plurality of first slaves via the at least one first type auxiliary bus;
at least one second auxiliary port coupled to the plurality of second slaves via the at least one second type auxiliary bus; and
a hub controller configured to:
receive a predefined RFFE command sequence identifying the hybrid bus hub circuit and comprising at least one indication configured to identify at least one selected auxiliary bus among the at least one first type auxiliary bus and the at least one second type auxiliary bus for communication with the RFFE master;
activate the at least one first type auxiliary bus and deactivate the at least one second type auxiliary bus in response to receiving the at least one indication that identifies the at least one first type auxiliary bus; and
activate the at least one second type auxiliary bus and deactivate the at least one first type auxiliary bus in response to receiving the at least one indication that identifies the at least one second type auxiliary bus.

13. The apparatus of claim 12 wherein:
the hybrid bus hub circuit is configured to be identified by a specially assigned unique slave identification (USID) between hexadecimal value one (0x1) and hexadecimal value fifteen (0xF); and
the hub controller is further configured to activate one of the at least one first auxiliary port and the at least one second auxiliary port in response to receiving the predefined RFFE command sequence comprising the specially assigned USID.

14. The apparatus of claim 13 wherein each of the at least one first type auxiliary bus and the at least one second type auxiliary bus is configured to support a plurality of USIDs between hexadecimal value one (0x1) and hexadecimal value fifteen (0xF) excluding the specially assigned USID.

15. The apparatus of claim 12 wherein:
the at least one first type auxiliary bus comprises at least one RFFE bus comprising at least two wires and configured to communicate RFFE command sequences and data payloads at a first data rate; and
the at least one second type auxiliary bus comprises a single-wire bus (SuBUS) consisting of only one wire and configured to communicate SuBUS command sequences and data payloads at a second data rate different from the first data rate.

16. The apparatus of claim 15 wherein the hub controller is further configured to:

receive the predefined RFFE command sequence identifying the hybrid bus hub circuit and comprising the at least one indication configured to identify the at least one first type auxiliary bus;
activate the at least one first auxiliary port and deactivate the at least one second auxiliary port in response to receiving the predefined RFFE command sequence comprising the at least one indication configured to identify the at least one first type auxiliary bus;
receive at least one first RFFE register-write command sequence corresponding to a selected first slave among the plurality of first slaves;
forward the at least one first RFFE register-write command sequence to the at least one first auxiliary port;
receive the predefined RFFE command sequence identifying the hybrid bus hub circuit and comprising the at least one indication configured to identify the at least one second type auxiliary bus;
activate the at least one second auxiliary port and deactivate the at least one first auxiliary port in response to receiving the predefined RFFE command sequence comprising the at least one indication configured to identify the at least one second type auxiliary bus;
receive at least one second RFFE register-write command sequence corresponding to a selected second slave among the plurality of second slaves;
convert the at least one second RFFE register-write command sequence into at least one SuBUS register-write command sequence corresponding to the selected second slave; and
provide the at least one SuBUS register-write command sequence to the at least one second auxiliary port.

17. The apparatus of claim 15 wherein the hub controller is further configured to:
receive the predefined RFFE command sequence identifying the hybrid bus hub circuit and comprising the at least one indication configured to identify the at least one first type auxiliary bus;
activate the at least one first auxiliary port and deactivate the at least one second auxiliary port in response to receiving the predefined RFFE command sequence comprising the at least one indication configured to identify the at least one first type auxiliary bus;
receive at least one first RFFE register-write command sequence corresponding to the plurality of first slaves;
store the at least one first RFFE register-write command sequence in the plurality of first slaves via the at least one first auxiliary port;
receive the predefined RFFE command sequence identifying the hybrid bus hub circuit and comprising the at least one indication configured to identify the at least one second type auxiliary bus;
activate the at least one second auxiliary port and deactivate the at least one first auxiliary port in response to receiving the predefined RFFE command sequence comprising the at least one indication configured to identify the at least one second type auxiliary bus;
receive at least one second RFFE register-write command sequence corresponding to the plurality of second slaves;
convert the at least one second RFFE register-write command sequence into at least one SuBUS register-write command sequence corresponding to the plurality of second slaves;
store the at least one SuBUS register-write command sequence in the plurality of second slaves via the at least one second auxiliary port;

receive at least one RFFE trigger command sequence corresponding to a broadcast slave identification (BSID);
activate the at least one first auxiliary port and the at least one second auxiliary port in response to receiving the at least one RFFE trigger command sequence;
convert the at least one RFFE trigger command sequence into at least one SuBUS trigger command sequence corresponding to the BSID; and
provide concurrently the at least one RFFE trigger command sequence and the at least one SuBUS trigger command sequence to the at least one first auxiliary port and the at least one second auxiliary port, respectively.

18. The apparatus of claim 15 wherein the hub controller is further configured to:
receive the predefined RFFE command sequence identifying the hybrid bus hub circuit and comprising the at least one indication configured to identify the at least one first type auxiliary bus;
activate the at least one first auxiliary port and deactivate the at least one second auxiliary port in response to receiving the predefined RFFE command sequence comprising the at least one indication configured to identify the at least one first type auxiliary bus;
receive at least one first RFFE register-write command sequence corresponding to one or more selected first slaves among the plurality of first slaves;
store the at least one first RFFE register-write command sequence in the one or more selected first slaves via the at least one first auxiliary port;
receive the predefined RFFE command sequence identifying the hybrid bus hub circuit and comprising the at least one indication configured to identify the at least one second type auxiliary bus;
activate the at least one second auxiliary port and deactivate the at least one first auxiliary port in response to receiving the predefined RFFE command sequence comprising the at least one indication configured to identify the at least one second type auxiliary bus;
receive at least one second RFFE register-write command sequence corresponding to one or more selected second slaves among the plurality of second slaves;
convert the at least one second RFFE register-write command sequence into at least one SuBUS register-write command sequence corresponding to the one or more selected second slaves;
store the at least one SuBUS register-write command sequence in the one or more selected second slaves via the at least one second auxiliary port;
receive at least one RFFE trigger command sequence corresponding to a group slave identification (GSID) associated with the one or more selected first slaves and the one or more selected second slaves;
activate the at least one first auxiliary port and the at least one second auxiliary port in response to receiving the at least one RFFE trigger command sequence;
convert the at least one RFFE trigger command sequence into at least one SuBUS trigger command sequence corresponding to the GSID; and
provide concurrently the at least one RFFE trigger command sequence and the at least one SuBUS trigger command sequence to the at least one first auxiliary port and the at least one second auxiliary port, respectively.

19. The apparatus of claim 15 wherein the hub controller is further configured to:
receive the predefined RFFE command sequence identifying the hybrid bus hub circuit and comprising the at least one indication configured to identify the at least one first type auxiliary bus;
activate the at least one first auxiliary port and deactivate the at least one second auxiliary port in response to receiving the predefined RFFE command sequence comprising the at least one indication configured to identify the at least one first type auxiliary bus;
receive at least one first RFFE register-read command sequence corresponding to a selected first slave among the plurality of first slaves;
forward the at least one first RFFE register-read command sequence to the selected first slave via the at least one first auxiliary port;
receive at least one first RFFE data payload from the selected first slave via the at least one first auxiliary port; and
forward the at least one first RFFE data payload to the RFFE master via the primary port.

20. The apparatus of claim 19 wherein the hub controller is further configured to:
receive the predefined RFFE command sequence identifying the hybrid bus hub circuit and comprising the at least one indication configured to identify the at least one second type auxiliary bus;
activate the at least one second auxiliary port and deactivate the at least one first auxiliary port in response to receiving the predefined RFFE command sequence comprising the at least one indication configured to identify the at least one second type auxiliary bus;
receive at least one RFFE register-poll command sequence corresponding to a selected second slave among the plurality of second slaves;
convert the at least one RFFE register-poll command sequence into at least one SuBUS register-poll command sequence corresponding to the selected second slave;
provide the at least one SuBUS register-poll command sequence to the selected second slave via the at least one second auxiliary port;
receive at least one SuBUS data payload from the selected second slave via the at least one second auxiliary port;
store the at least one SuBUS data payload received from the selected second slave;
receive at least one second RFFE register-read command sequence corresponding to the selected second slave among the plurality of second slaves;
convert the at least one stored SuBUS data payload into at least one second RFFE data payload; and
provide the at least one second RFFE data payload to the RFFE master via the primary port.

* * * * *